United States Patent [19]

Okada et al.

[11] Patent Number: 4,904,063

[45] Date of Patent: Feb. 27, 1990

[54] LIQUID CRYSTAL LENSES HAVING A FRESNEL LENS

[75] Inventors: Takao Okada, Hachioji; Hisanari Shimazu, Akishima; Akitoshi Toda, Hachioji; Susumu Sato, Akita, all of Japan

[73] Assignee: Olympus Optical Co., Ltd., Japan

[21] Appl. No.: 199,535

[22] Filed: May 27, 1988

Related U.S. Application Data

[63] Continuation of Ser. No. 17,275, Feb. 20, 1987, abandoned.

[30] Foreign Application Priority Data

Mar. 5, 1986 [JP] Japan .................. 61-047510

[51] Int. Cl.⁴ .......................... G02F 1/13; G02B 1/06
[52] U.S. Cl. .......................... 350/347 V; 350/331 R; 350/336; 350/452
[58] Field of Search .............. 350/347 V, 347 R, 331, 350/342, 334, 336, 452, 347 E, 330; 340/784, 765

[56] References Cited

U.S. PATENT DOCUMENTS

| 4,037,929 | 7/1977 | Bricot et al. | 350/331 R |
| 4,190,330 | 2/1980 | Berreman | 350/347 R |
| 4,208,115 | 6/1980 | Proske | 350/331 R |
| 4,279,474 | 7/1981 | Belgorod | 350/331 R |
| 4,300,818 | 11/1981 | Schachar | 350/331 R |
| 4,373,218 | 2/1983 | Schachar | 350/347 V |
| 4,576,441 | 3/1986 | Kubick | 350/452 |
| 4,601,545 | 7/1986 | Kern | 350/347 V |
| 4,670,095 | 6/1987 | Negishi | 350/167 |
| 4,795,248 | 1/1989 | Okada et al. | 350/347 V |

FOREIGN PATENT DOCUMENTS

| 0156221 | 7/1986 | Japan | 350/331 R |
| 0156227 | 7/1986 | Japan | 350/331 R |
| 2169417 | 7/1986 | United Kingdom | 350/334 |

*Primary Examiner*—Stanley D. Miller
*Assistant Examiner*—Tai V. Duong
*Attorney, Agent, or Firm*—Louis Weinstein

[57] ABSTRACT

A liquid crystal lens includes a liquid crystal cell formed by lens component members, at least one of the lens component members being formed of a Fresnel lens whose surface is formed by a number of annular ring-shaped Fresnel grooves with their crests leveled.

8 Claims, 3 Drawing Sheets

LIQUID CRYSTAL LENSES HAVING A FRESNEL LENS

This is a continuation of application Ser. No. 017,275, filed Feb. 20, 1987, now abandoned.

FIELD OF THE INVENTION AND RELATED ART STATEMENT

The present invention relates to a variable focal length lens employing a liquid crystal, and more particularly, to such a lens which improves the response and recovery characteristic to adjustment of a focal length thereof.

A technique for making a lens variable in its focal length utilizing the double refraction of a liquid crystal has been known from, for example, Japanese Laid Open Patent Publication Sho 52/1977 - 32348, Japanese Patent Publication Sho 61/1986 - 45812, and U.S.A. Pats. No. 4,190,330 and No. 4,037,929.

An example of such a conventional lens employing a liquid crystal (hereinafter referred to as a liquid crystal lens), as shown in FIGS. 4 and 5, is constructed by including a spherical concave lens 21 and a plate glass 22 as structural members thereof on which transparent conductive layers 23 and 24 are respectively provided and confining a liquid crystal 26 in a hollow space formed by joining these members together through an insulator spacer 25 to form a liquid crystal lens 20. An a.c. voltage from an a.c. power source 27 is adjustably applied across the layers 23 and 24 through a variable resistor 29. Even when the a.c. voltage is not applied, an orientation treatment is performed to the liquid crystal 26 so as to arrange the liquid crystal molecules in a specific direction. Thus, the liquid crystals in FIGS. 4 and 5 have an homogeneous orientation.

When a voltage is applied to the liquid crystal lens 20, molecules of the liquid crystal 26 rotate so as to arrange their major axes in the direction of the electric field (when the dielectric anisotropy of the liquid crystal is positive). When a polarizing plate 28 is combined, as shown in FIG. 6, with the liquid crystal lens 20 whose liquid crystal has a director shown with an arrow n in FIG. 5 in such a manner that only extraordinary rays can be incident upon the liquid crystal lens 20, the apparent refractive index of the liquid crystal 26 varies from $n_e$ to extraordinary rays to $n_0$ to ordinary rays as the liquid crystal molecules in the liquid crystal lens 20 rotate with variable voltages applied. Assuming that a focal length is n and radii of curvature of both sides of the lens are $r_1$ and $r_2$ respectively, the focal length of the lens is given as follows:

$$\frac{1}{f} = (n-1)\left(\frac{1}{r_1} - \frac{1}{r_2}\right)$$

It is noted from the equation that a focal length of the lens can be changed by changing its refractive index n.

It is known that when a lens is constructed with a Fresnel lens having the same focal length as the lens, a thickness of the lens can be reduced. Thus, when a lens has a structure of a Fresnel lens that has a surface consisting of a concentric series of simple lens sections, it is possible to reduce the effective thickness of a liquid crystal layer to the extent of the sum of the depth of grooves in the Fresnel lens and a thickness of the spacer for preventing an electrical short circuit between electrodes. As a result, the lens thus constructed can be reduced in thickness so that its thickness is less than that of the liquid crystal lens 20 shown in FIGS. 4 and 5. In addition, the diameter of the lens can be made large while the response and recovery time are reduced. These have been disclosed in Japanese Laid Open Publication Sho 60/1985 - 50510.

However, there are a variety of Fresnel lenses with the same focal length. The following are three typical examples of Fresnel lenses having a number of annular ring-shaped Fresnel grooves exhibiting a sawtooth wave in section which is formed by a portion 7a (see FIG. 7A) parallel to the center axis of the lens which is part of a cylindrical surface and a curved portion 7b (see FIG. 7A).

A first example, as shown in FIG. 7A, is a Fresnel lens with Fresnel groove crests leveled where the grooves are formed such that their crests 7c are leveled (i.e., the crests 7c all lie in a common plane), their curved surfaces 7b increase in inclination toward the lens periphery and their troughs 7d increase in depth toward the lens periphery.

A second example, as shown in FIG. 7B, is a Fresnel lens with Fresnel groove troughs leveled where the grooves are formed such that their troughs 7d are leveled, their curved surfaces 7b increase in inclination toward the lens periphery and their crests 7c increase in height toward the lens periphery.

A third example, as shown in FIG. 7C, is a Fresnel lens with Fresnel groove crests and troughs leveled where their crests 7c and the troughs 7c are leveled, their curved surfaces 7b increase in inclination toward the lens periphery and their groove pitches decrease unequally toward the lens periphery.

Considering now oblique rays incident upon a Fresnel lens from the bottom in FIGS. 7A, B and C, as is apparent from the drawings, part of rays subjected to refraction by the curved surfaces 7b will be vignetted by the cylindrical surface 7a. Also, flare and ghost images will occur. For this reason, a Fresnel lens with its groove troughs leveled as shown in FIG. 7B has been commonly employed in order to reduce the height of the crests 7c of the cylindrical surfaces 7a whose surfaces are parallel to the lens axis.

At this time, when the above stated Fresnel lens is employed in a liquid crystal lens, the response and recovery time of the lens is a big problem. Since the response and recovery time depends upon a thickness of a liquid crystal layer, a Fresnel lens is required to reduce a thickness of a liquid crystal layer.

However, a Fresnel lens with the groove troughs leveled which has been commonly used is not sufficiently reduced in the response and recovery time.

Further, the Fresnel lens with the groove troughs leveled is maximum in thickness at its central area of the liquid crystal layer, so that it has the largest response and recovery time at the central area of the liquid crystal layer which is most important as a lens.

Still further, a liquid crystal cell employing a Fresnel lens with the groove troughs leveled requires an amount of crystal liquid more than the one in a spherical lens, resulting in an expensive liquid crystal lens.

OBJECT AND SUMMARY OF THE INVENTION

It is an object of the present invention to provide liquid crystal lenses which eliminate the disadvantage of a liquid crystal lens employing the above described conventional Fresnel lens and which have a good response characteristic, especially at the central area of the lens.

According to the present invention, a liquid crystal cell can be reduced in thickness when a Fresnel lens with the groove crests leveled is employed in a liquid crystal cell for forming a liquid crystal lens. Consequently, it is possible to reduce the response and recovery time of the liquid crystal lens when a voltage is applied thereto, which has a variable focal length and a rapid response characteristic. Further, an amount of liquid crystal to be charged in the cell is reduced and thus an inexpensive liquid crystal lens can be obtained.

DETAILED DESCRIPTION OF PREFERRED EMBODIMENTS

Figure 1:
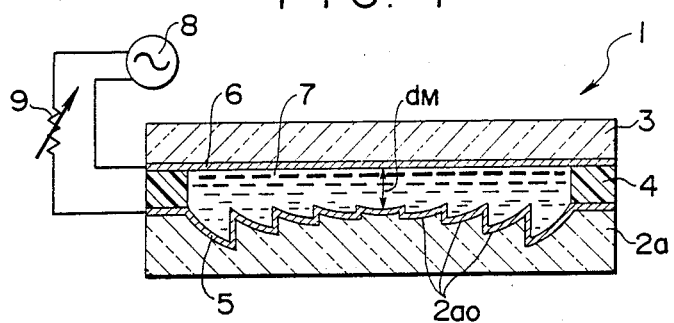
FIG. 1 is an enlarged sectional view of one embodiment of a liquid crystal lens according to the present invention.
Figure 4:
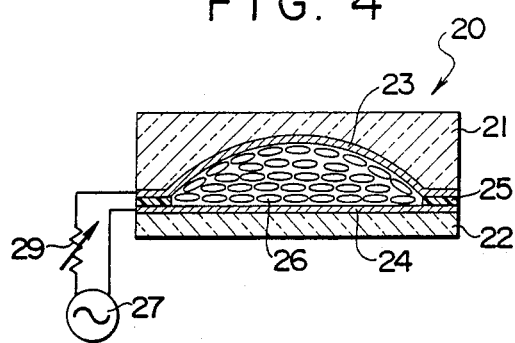
FIGS. 4 and 5 are longitudinal and transverse sectional views of a conventional liquid crystal employing a spherical lens respectively.
Figure 5:
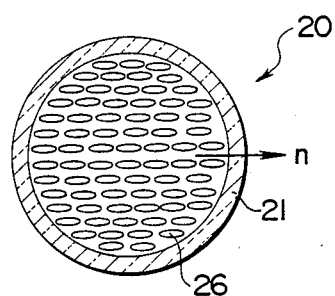
Figure 6:
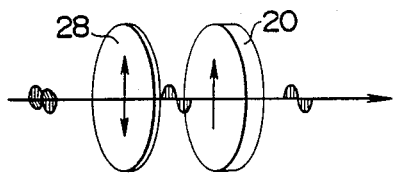
FIG. 6 is a perspective view of a liquid crystal lens combined with a polarizing plate.

In FIG. 1, which shows a first embodiment of the present invention, a liquid crystal lens 1 comprises a Fresnel lens 2a whose surface is formed of the crest leveled grooves 2ao and a plate glass 3. A liquid crystal cell is formed by joining the Fresnel lens 2a and the plate glass 3 through an insulator spacer 4. Transparent conductive layers 5 and 6 are respectively formed on the inner sides of the Fresnel lens 2a and the plate glass 3, which sides form the liquid crystal cell therebetween. The cell is charged with a liquid crystal 7 of the nematic type to form the liquid crystal lens 1. An a.c. voltage from an a.c. power source 8 is applied through a variable resistor 9 to the transparent layers 5 and 6 as is in FIG. 4. Liquid crystal molecules within the cell are subjected to an orientation treatment so as to be arranged in a specific direction to have a homogeneous orientation.

Figure 3:
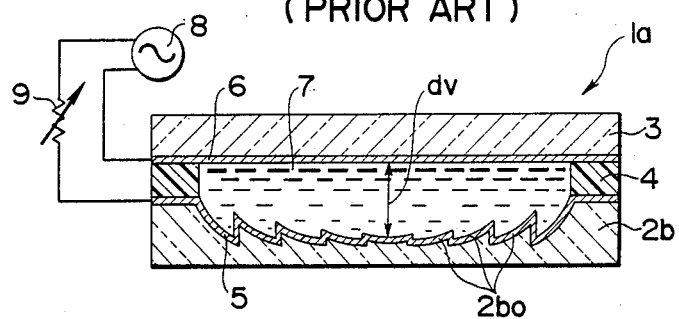
FIG. 3 is an enlarged sectional view of a conventional liquid crystal lens employing a Fresnel lens whose surface is formed of grooves of the trough leveled type.

When the liquid crystal lens 1 with such a structure, whose liquid crystal layer is greatly reduced in thickness compared with a conventional liquid crystal lens 1a shown in FIG. 3, is combined with a polarizing plate (not shown) and a voltage from the a.c. power source 8 is applied to the liquid crystal within the cell through the variable resistor 9, the liquid crystal molecules rotate to be arranged in the direction of the longitudinal axis thereof and can be rapidly adjusted to a desired focal length because of the reduced thickness of the liquid crystal layer. In addition, since the recovery time is reduced, when the voltage is removed from the liquid crystal lens 1, it is rapidly restored to its initial focal length. Thus, the liquid crystal lens 7 has the advantage of its focal length being rapidly adjustable.

In addition the central area of a lens is generally important for use and it is desirous to improve the response and recovery characteristic at the central area. Since a liquid crystal lens which is formed of a Fresnel lens with the groove crests leveled has a comparatively reduced thickness of the liquid crystal layer at the central area of the lens, the present invention provides a liquid crystal lens of the structure where a characteristic at the central area is effectively improved.

While the description with reference to FIG. 1 is to form the liquid crystal cell comprising the plate glass 3 and the crest leveled Fresnel lens 2a, it may be possible to form a liquid crystal cell by employing a Fresnel lens i place of the plate glass 3 in such a manner that these Fresnel lenses are in opposing relationship with each other.

Figure 2:
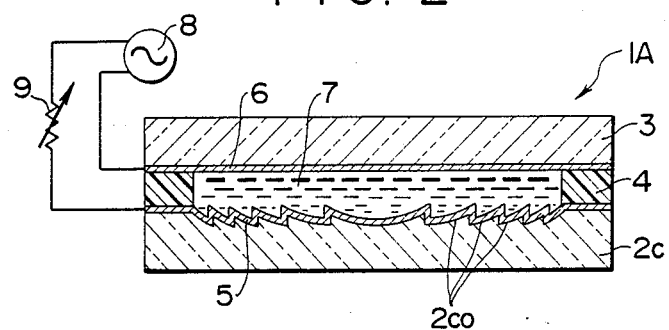
FIG. 2 is an enlarged sectional view of another embodiment of a liquid crystal lens according to the present invention.

In FIG. 2, which shows a second embodiment of the present invention, a liquid crystal lens 1A comprises a Fresnel lens 2c whose surface is formed of Fresnel grooves 2co whose crests and troughs are leveled (uniform depth) by changing pitches and a plate glass 3. Other structures of FIG. 2 are the same as the first embodiment.

When a liquid crystal cell is formed of the Fresnel lens 2c with the crests and troughs leveled and with varying pitches, it will be understood that the response and recovery characteristic can be effectively improved even at the peripheral area in addition to at the central area of the cell.

The reason for the improvement on the response and recovery time of the liquid crystal Fresnel lens according to the present invention will be described briefly in the following.

In a liquid crystal within the cell in a parallel plane form, assuming that an applied voltage is V, the elastic constant and viscosity constant of the liquid crystal are k and $\gamma_1$ respectively, the difference between dielectric constants in the parallel and vertical directions of the liquid crystal is $\Delta\xi(\Delta\xi=\xi''-\xi\perp)$, the dielectric constant in a vacuum is $\xi_0$ and a thickness of the liquid crystal layer is d, the response time Tr of the liquid crystal is given as follows.

$$\frac{1}{Tr} = \frac{\xi_0 \Delta\xi V^2 - k\pi^2}{\gamma_1 d^2} \qquad (1)$$

In the equation, assuming that the values other than the thickness d are constant, the response time Tr results in the following.

$$Tr \propto d^2 \qquad (2)$$

Namely, the response time Tr is in direct proportion to $d^2$.

Figure 7A:
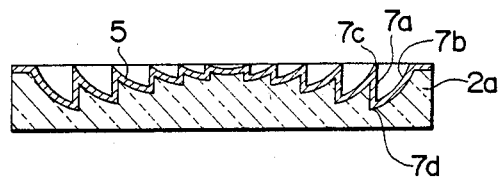
FIGS. 7A to 7C are sectional views illustrating a variety of examples of Fresnel grooves for forming a Fresnel lens surface.
Figure 7B:
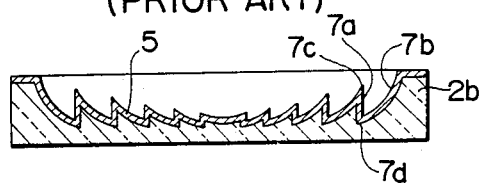
Figure 7C:
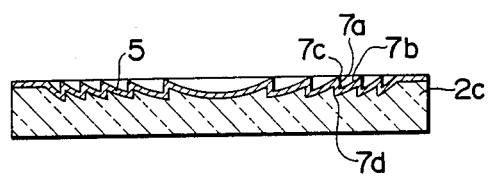

On the other hand, it is known that there are a variety of methods of working Fresnel lenses as described above, a Fresnel lens 2a of the crests leveled type (constant pitch) as shown in FIG. 7A, a Fresnel lens 2b of the troughs leveled type (constant pitch) as shown in FIG. 7B and a Fresnel lens 2c of the crests and troughs leveled type with varying pitches (constant depth) as shown in FIG. 7C.

A liquid crystal cell formed by these Fresnel lens and a plate glass will be described specifically with reference to FIG. 1 which shows a liquid crystal cell employing a Fresnel lens of the crests leveled type and FIG. 3 which shows a conventional liquid crystal lens employing a Fresnel lens 2b of the troughs leveled type whose surface is formed of Fresnel grooves 2bo with their troughs leveled. Noting thicknesses especially at the central areas of the liquid crystal layer in the liquid crystal lenses 1, 1a, they give $d_V > d_M$. Viewing the central area itself of the liquid crystal cell, it will be understood that as is clear from the equation (2) regarding the response and recovery time on a liquid crystal cell in a parallel plane form, the liquid crystal cell employing the Fresnel lens 2a shown in FIG. 1 has shorter response and recovery time than that shown in FIG. 3.

By way of example, when the liquid crystal cells are formed by interposing a spacer of 10 μm between the Fresnel lens with a grooved surface having a radius of 30 mm and a pitch of 50 μm and the glass plate, both cells give $d_V \simeq 50$ μm (approximately 40 μm + 10 μm) and $d_M \simeq 10$ μm (approximately 0 μm + 10 μm). Thus, the liquid crystal lens 1 with the Fresnel lens of the crest leveled type can be reduced to nearly one fifth in thickness at the central area of the liquid crystal layer as compared with the conventional one.

Accordingly, the response characteristic at the central area of a liquid crystal cell formed by the crest leveled Fresnel lens 2a can be improved by twenty five times that of a liquid crystal cell formed by the trough leveled Fresnel lens 2b on calculation. With the liquid crystal lens according to the present invention, unlike a liquid crystal cell in a parallel plane form, the liquid crystal layer varies in thickness due to the unevenness of the Fresnel lens surface according to measuring positions. In addition, when the Fresnel lens with a uniform pitch is employed, the improvement in the response characteristic at the peripheral edge of the liquid crystal cell is insignificant compared with the central area. It is noted, however, that these can be improved by employing the Fresnel lens 2c as shown in FIG. 7C in which the pitch is reduced as approaching the peripheral edge of the liquid crystal cell.

What is claimed is:

1. A liquid crystal lens including a cell formed by lens component members, each being uniformly coated with a transparent conductive layer, and in which a liquid crystal is charged, at least one of said lens component members having a Fresnel lens surface, characterized in that
   a number of annular ring-shaped Fresnel grooves forming said Fresnel lens surface are formed by leveling their crests and troughs with a uniform depth.

2. A liquid crystal lens according to claim 1 wherein the lens portion surrounded by the center crest has a surface area greater than any of the remaining lens portions to enhance the response time of the center portion thereof.

3. A liquid crystal lens including a cell formed by lens component members which are uniformly coated with a transparent conductive layer, and in which a liquid crystal is charged, at least one of said lens component members having a Fresnel lens surface, characterized in that
   a number of annular ring-shaped Fresnel grooves forming said Fresnel lens surface are of equal height, the height of said grooves being measured in the direction of the central axis of the Fresnel lens.

4. A liquid crystal lens including a cell formed by lens component members in which a liquid crystal is charged, at least one of said lens component members having a Fresnel lens surface, characterized in that
   a number of annular ring-shaped Fresnel grooves forming said Fresnel lens surface are formed by leveling their crests, the crests in the Fresnel lens surface facing the liquid crystal lying in a common plane so that at least a center crest is closer to the surface of the remaining one of said lens component members than the other crests of the Fresnel lens to reduce the response time of the liquid crystal in the region of the center crest by a reduction amount at least as much as the response time of the liquid crystal in the regions of the crests moving toward the periphery of the lens.

5. A liquid crystal lens according to claim 4 in which the surfaces of the lens component members enclosing the liquid crystal are each provided with transparent conductive layers each uniformly coaxing said surfaces
   insulating means arranged about the periphery of said lens component members and between said conductive layers and cooperating with said lens component members to enclose said liquid crystal.

6. A liquid crystal lens according to claim 5 further comprising an alternating current source coupled to said conductive layers.

7. A liquid crystal lens according to claim 4 wherein the Fresnel grooves are each defined by a plurality of cylindrical surfaces of increasing diameter, one end of each cylindrical surface being the crest of a groove and the opposite end of each cylindrical surface being the trough of a groove;
   a curved surface extending from the trough of each cylindrical surface to the crest of the adjacent cylindrical surface, each curved surface having a different inclination, the center curved surface having the smallest inclination.

8. A liquid crystal lens according to claim 7 wherein the height of each curved surface increases in moving from the center of the Fresnel lens to the outer periphery.

* * * * *

UNITED STATES PATENT AND TRADEMARK OFFICE
CERTIFICATE OF CORRECTION

PATENT NO. : 4,904,063

DATED : February 27, 1990

INVENTOR(S) : Okada et al.

It is certified that error appears in the above-identified patent and that said Letters Patent is hereby corrected as shown below:

Column 4, line 14, "i" should be --in--

Column 6, line 31, "coaxing" should be --coating--

Signed and Sealed this

Fourteenth Day of May, 1991

Attest:

HARRY F. MANBECK, JR.

Attesting Officer    Commissioner of Patents and Trademarks